Figure 1:
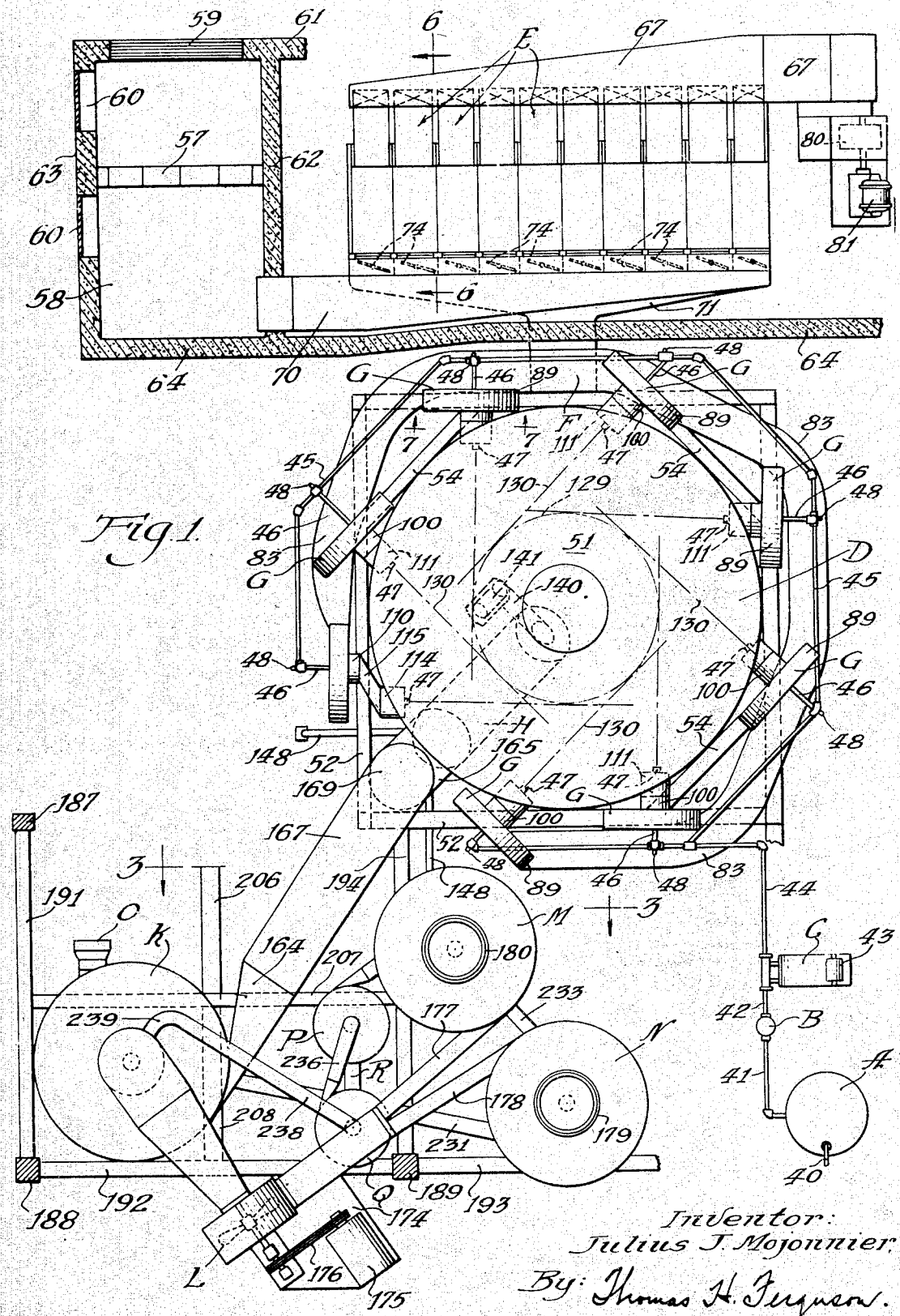

Oct. 23, 1945.   J. J. MOJONNIER   2,387,458
METHOD OF AND APPARATUS FOR DEHYDRATING SUBSTANCES
Filed Dec. 16, 1942   8 Sheets-Sheet 1

Inventor:
Julius J. Mojonnier
By: Thomas H. Ferguson.
Attorney

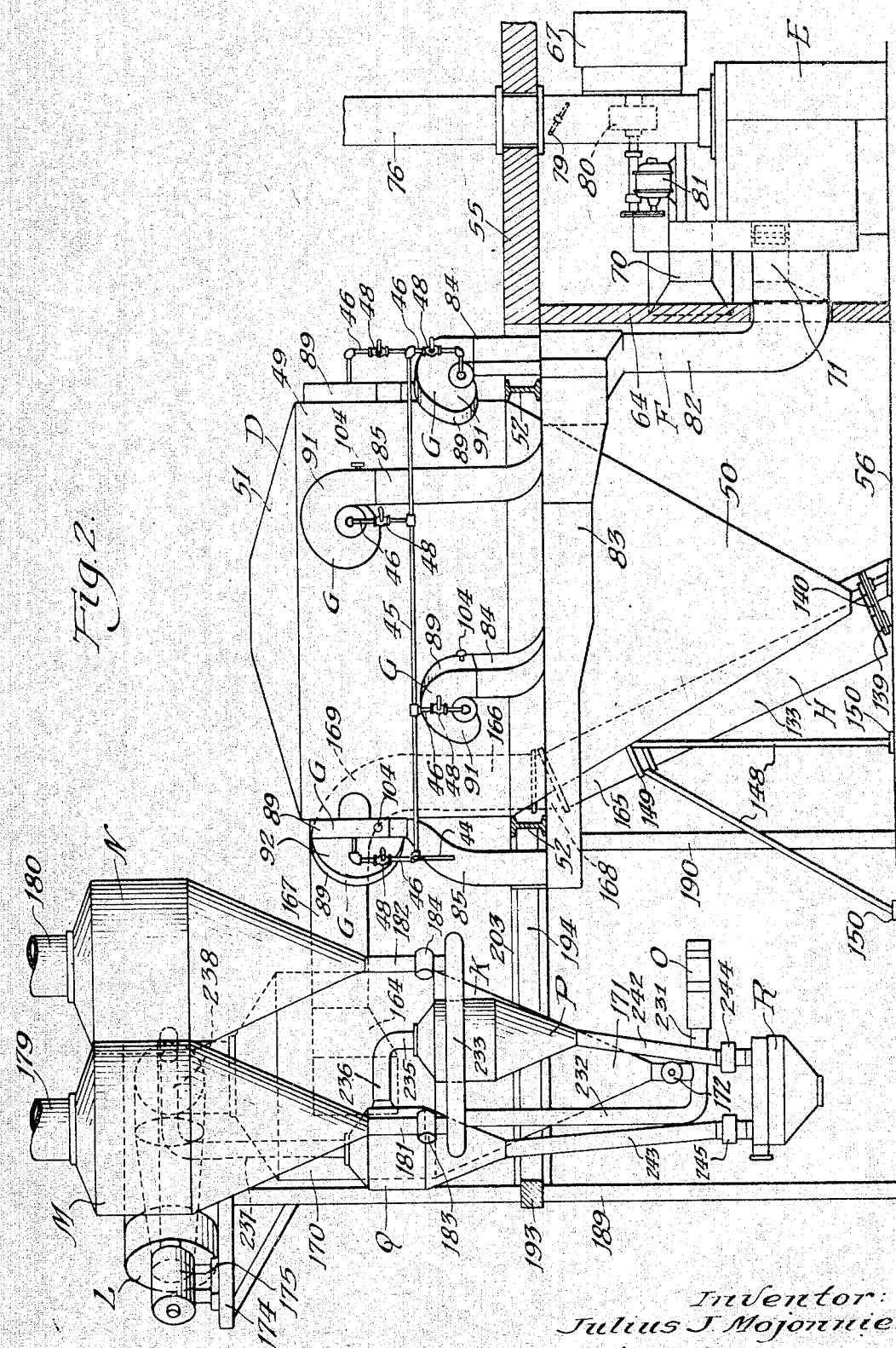

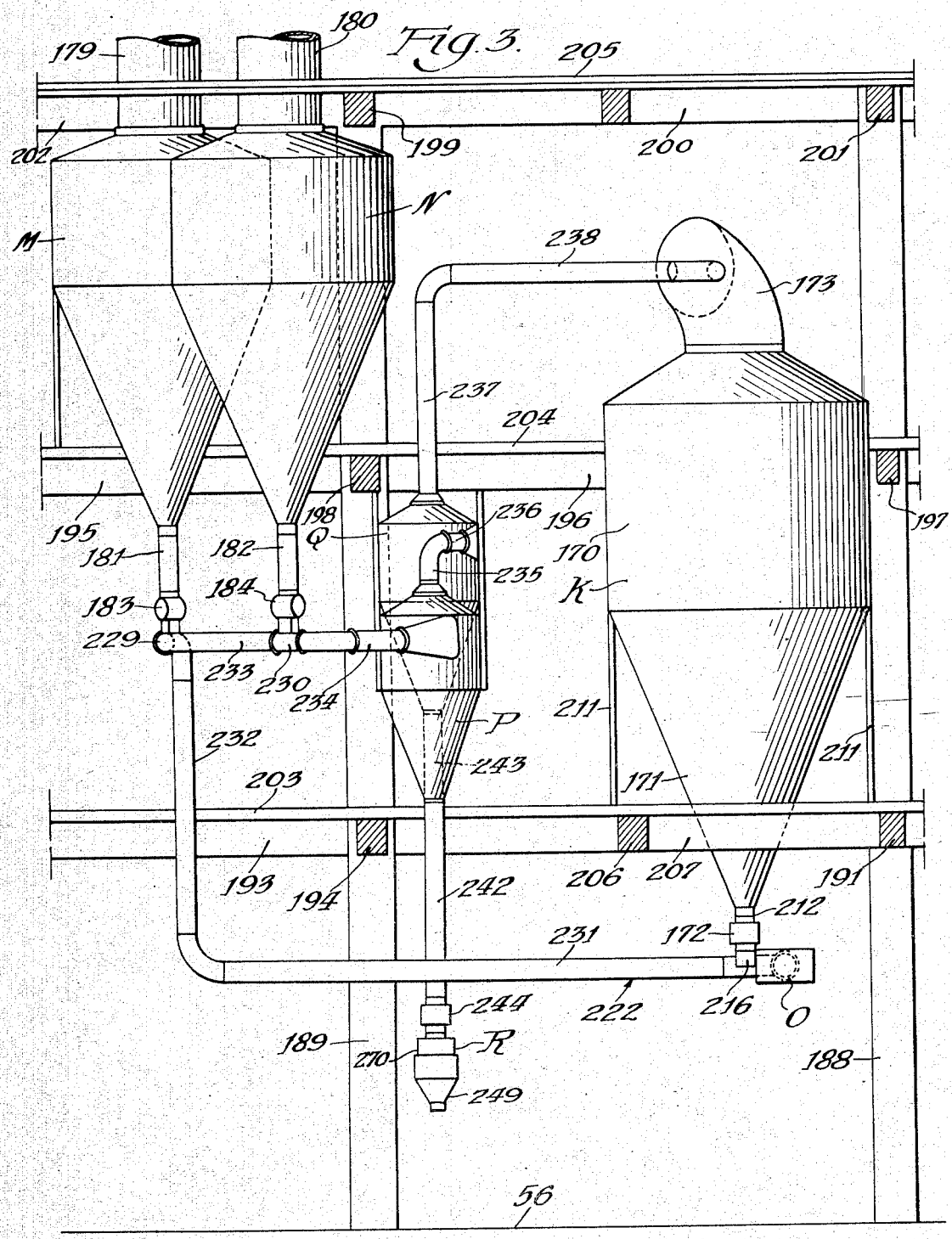

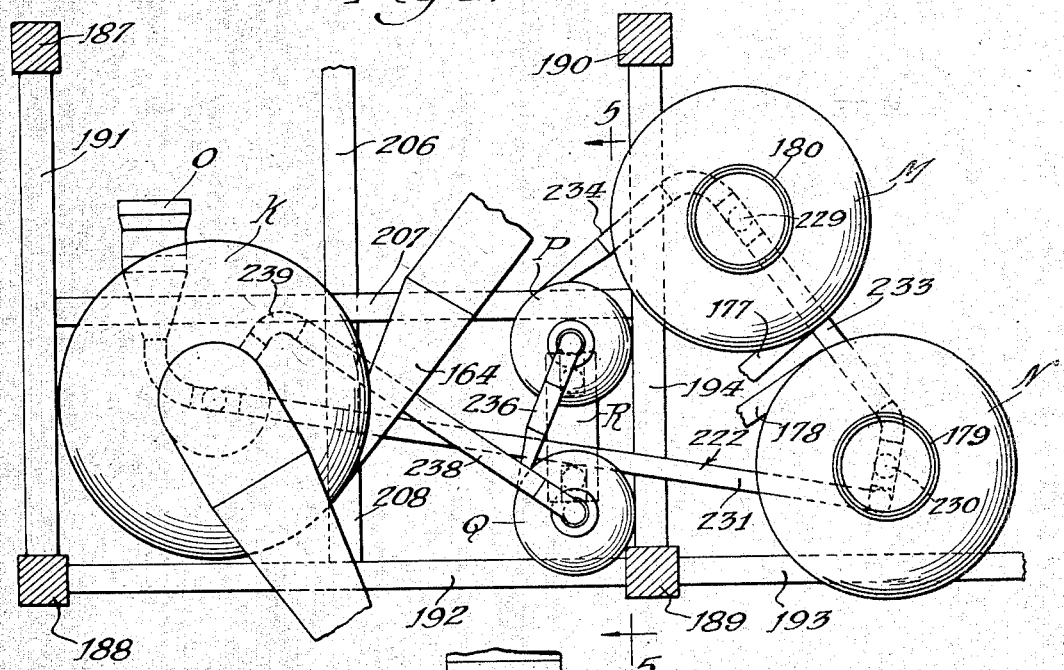
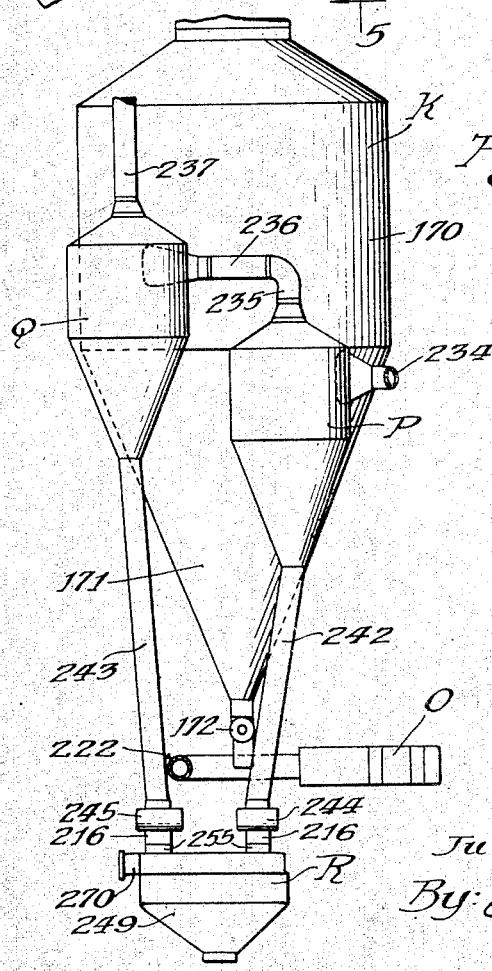

Oct. 23, 1945.　　　J. J. MOJONNIER　　　2,387,458
METHOD OF AND APPARATUS FOR DEHYDRATING SUBSTANCES
Filed Dec. 16, 1942　　　8 Sheets-Sheet 5
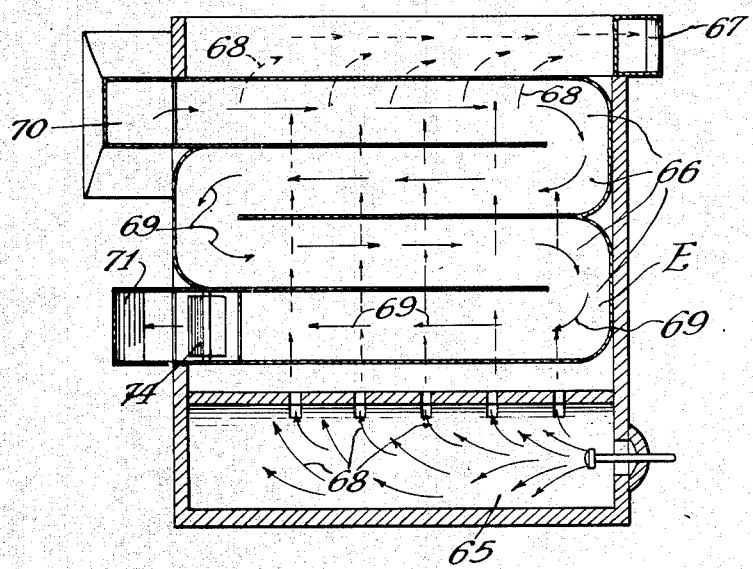
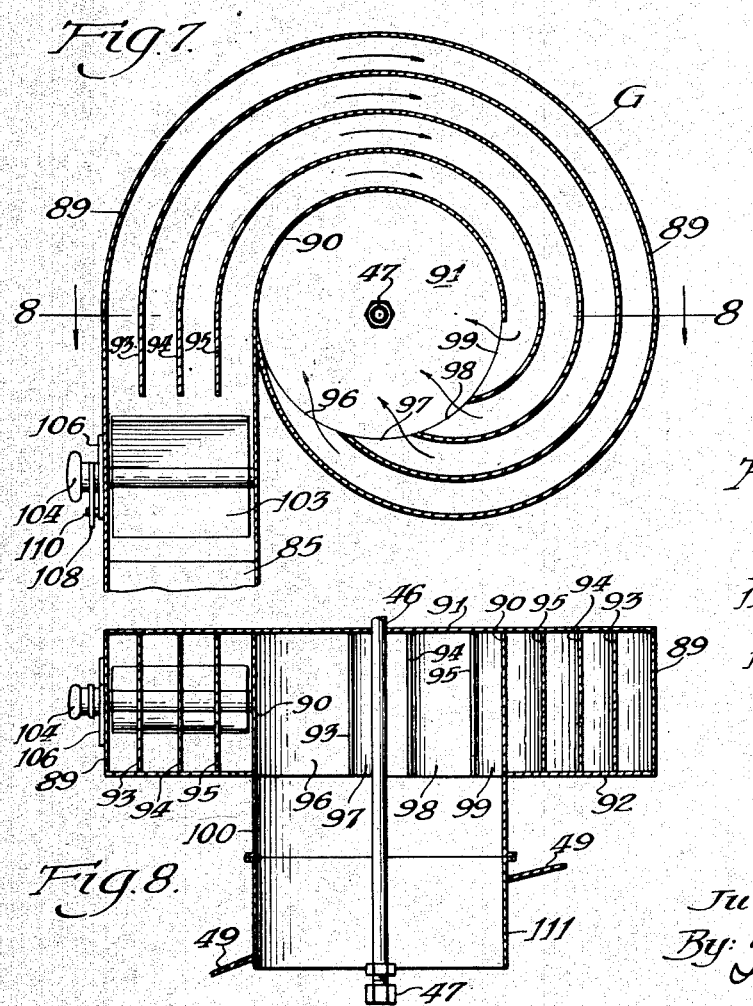
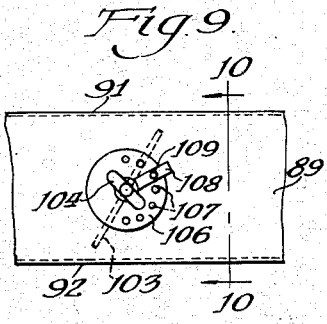
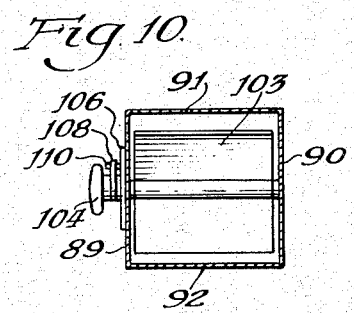
Inventor:
Julius J. Mojonnier
By: Thomas H. Ferguson
Attorney Oct. 23, 1945.     J. J. MOJONNIER     2,387,458
METHOD OF AND APPARATUS FOR DEHYDRATING SUBSTANCES
Filed Dec. 16, 1942     8 Sheets-Sheet 6
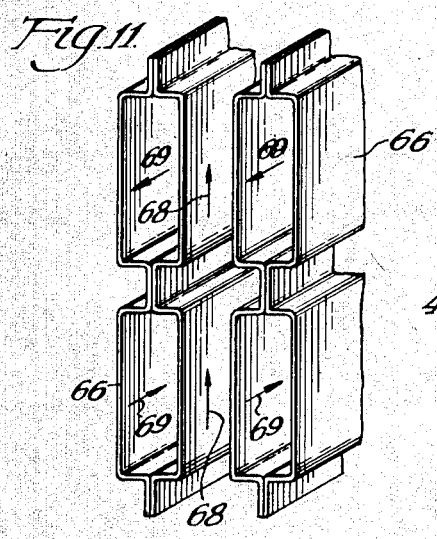
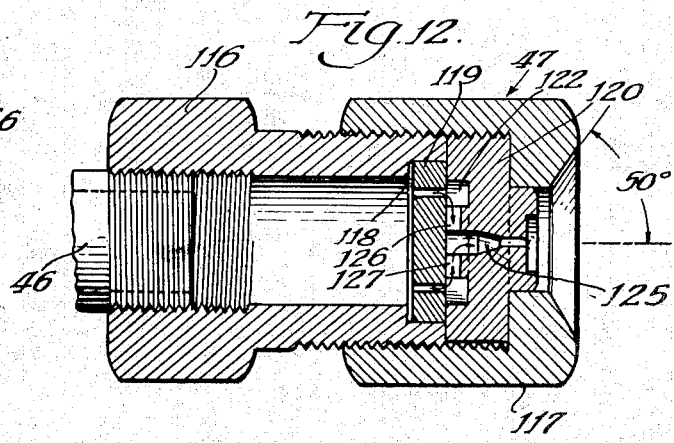
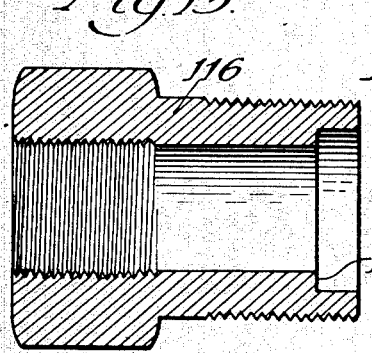
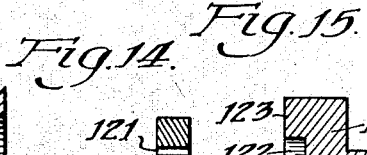
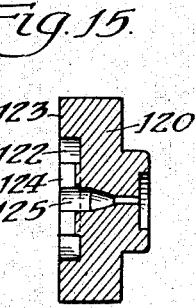
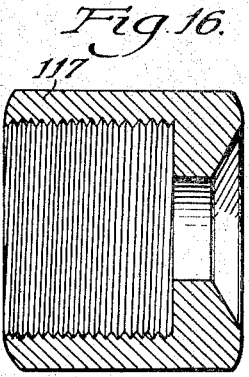
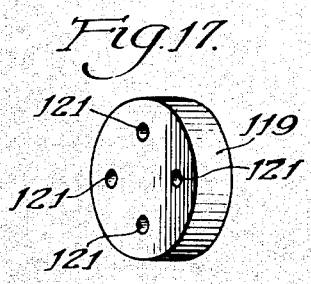
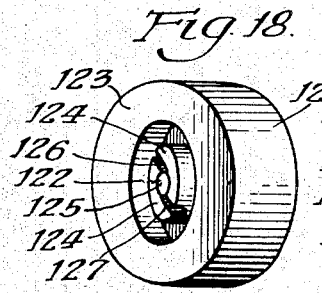
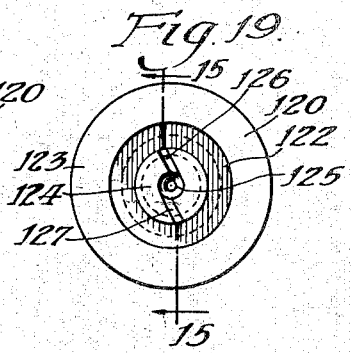
Inventor:
Julius J. Mojonnier
By Thomas H. Ferguson
Attorney Oct. 23, 1945.  J. J. MOJONNIER  2,387,458
METHOD OF AND APPARATUS FOR DEHYDRATING SUBSTANCES
Filed Dec. 16, 1942  8 Sheets-Sheet 7

Inventor:
Julius J. Mojonnier
By Thomas H. Ferguson
Attorney

Oct. 23, 1945.   J. J. MOJONNIER   2,387,458
METHOD OF AND APPARATUS FOR DEHYDRATING SUBSTANCES
Filed Dec. 16, 1942   8 Sheets-Sheet 8
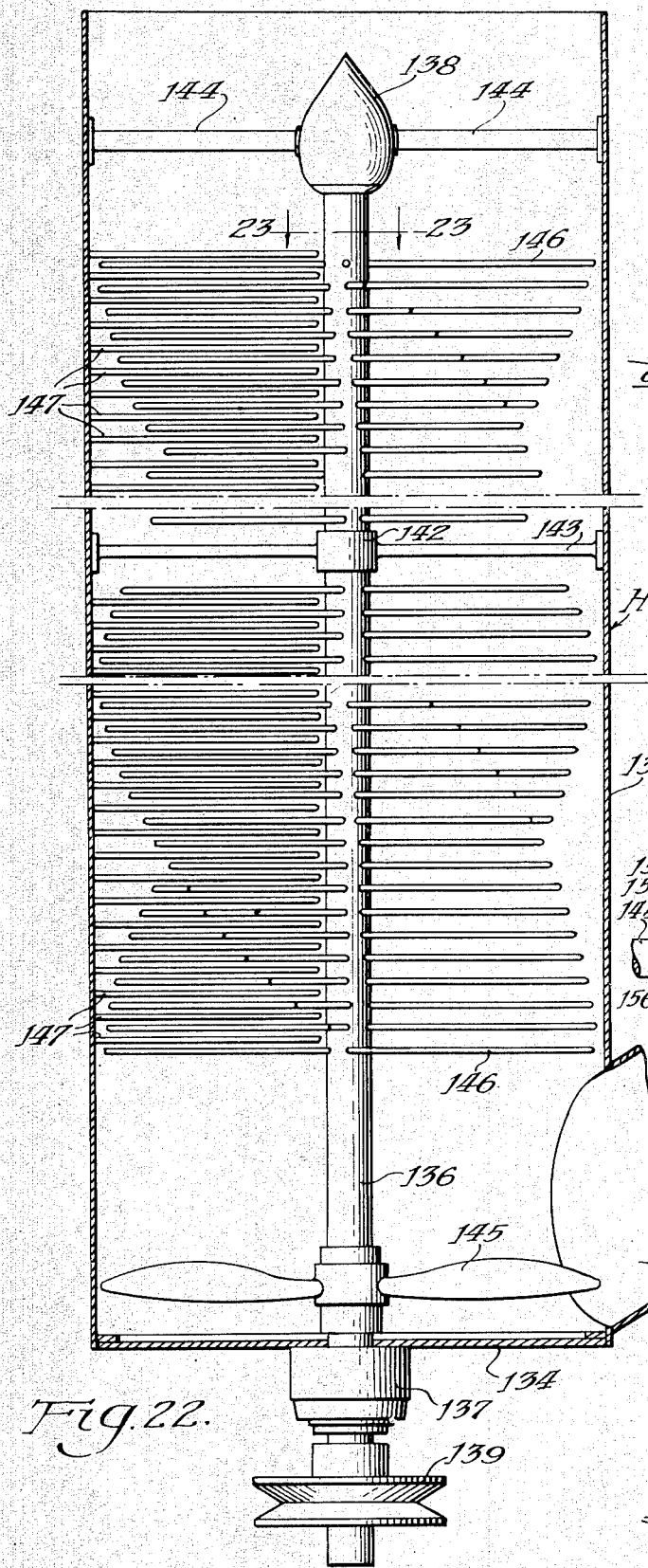
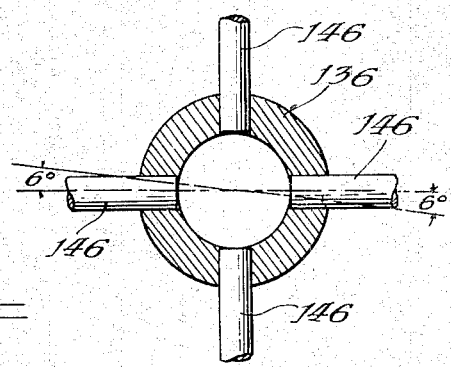
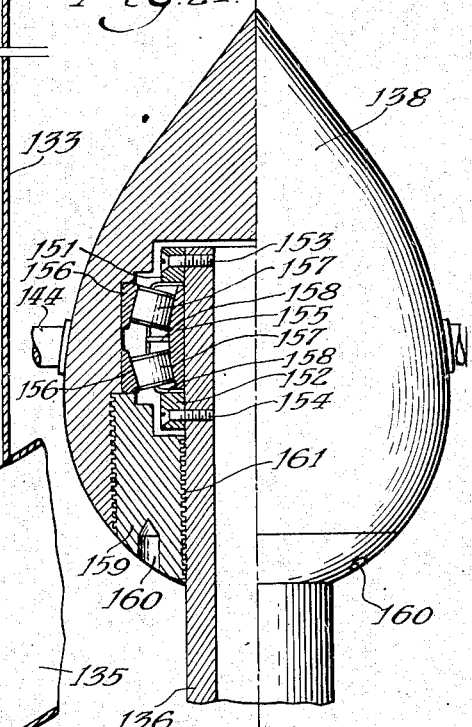
Inventor:
Julius J. Mojonnier
By: Thomas H. Ferguson
Attorney.

Patented Oct. 23, 1945

2,387,458

UNITED STATES PATENT OFFICE 2,387,458

METHOD OF AND APPARATUS FOR DEHYDRATING SUBSTANCES

Julius J. Mojonnier, Winfield, Ill., assignor to Mojonnier Bros. Co., a corporation of Illinois Application December 16, 1942, Serial No. 469,272

11 Claims. (Cl. 159—4)

The present invention relates to a method of, and apparatus for, dehydrating substances containing a considerable percentage of moisture, such as fresh eggs, whole milk, skimmilk, whey, vegetable purees, soups, fruit sauces, tomato juice, and other like liquids and semi-liquid products.

One object of the invention is to produce a dehydrated product which will be practically a dry powder.

Another object is to produce a product such that when it is reconstituted it will have its natural flavor, aroma and color, to a marked degree.

Another object is to produce a product which will possess all its original vitamins and enzymes.

Another object is to produce a product having a high degree of solubility and of good keeping quality.

These objects—a dry powder, natural flavor, ready solubility, and good keeping qualities—all contribute to the ready acceptance of the product by customers.

Another object of the invention is to make the process continuous.

Another object is to improve the efficiency in heat consumption. In other words, to get a larger number of pounds of powder per gallon of oil (the fuel employed) than is possible with prior art devices, with the same furnace.

Other objects have to do with the equipment and involve improving the mixing of the material worked upon with the heated air, the mechanism for jostling the material in the final drying operation, and the means for cooling the powder and mixing it in the final stages of the process.

Still another object is to produce a process which will be effective on thick pastes and heavy creams, as well as on highly fluid substances.

In carrying out the invention, these objects are attained by utilizing the principle of dehydration in a closed system in which the vapor of dehydration carries through with the powder and with the air. The vapor acts as a blanket to the powder. It prevents case hardening and it helps to keep the air away from the powder and thereby reduces or prevents oxidation. In actual practice it has been established that a greatly improved product results. It is believed that the protection furnished by the water of dehydration is the thing that accomplishes this result.

In the particular embodiment a stream of heated air is sucked through the equipment and the vacuum and heat and speed of action serve to abstract the moisture from the substance most effectively. The stream of air is kept in an unsaturated state throughout its flow.

The invention, together with its various features and advantages, will be more fully understood upon reference to the accompanying drawings wherein I have disclosed the novel method and apparatus by which the method may be carried out advantageously, while the scope of the invention will be set forth in the appended claims.

Figure 20:
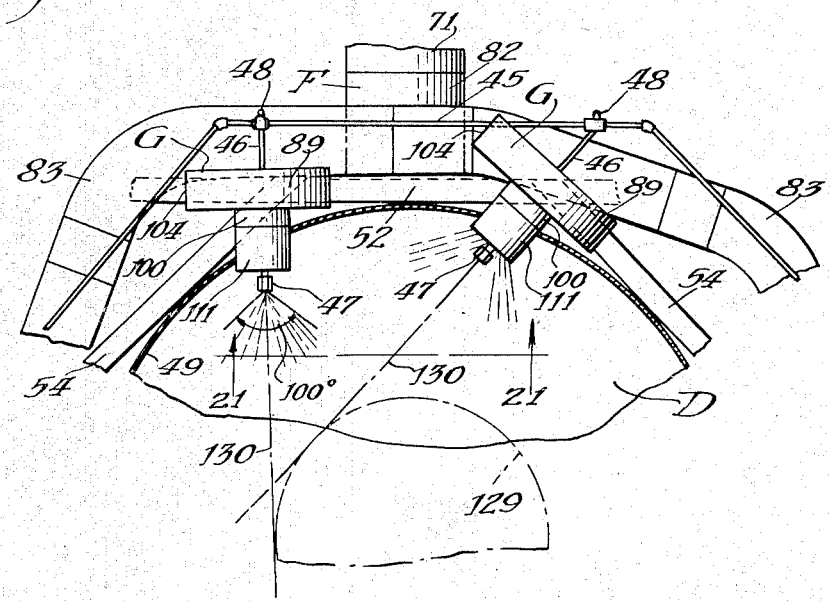
Figure 21:
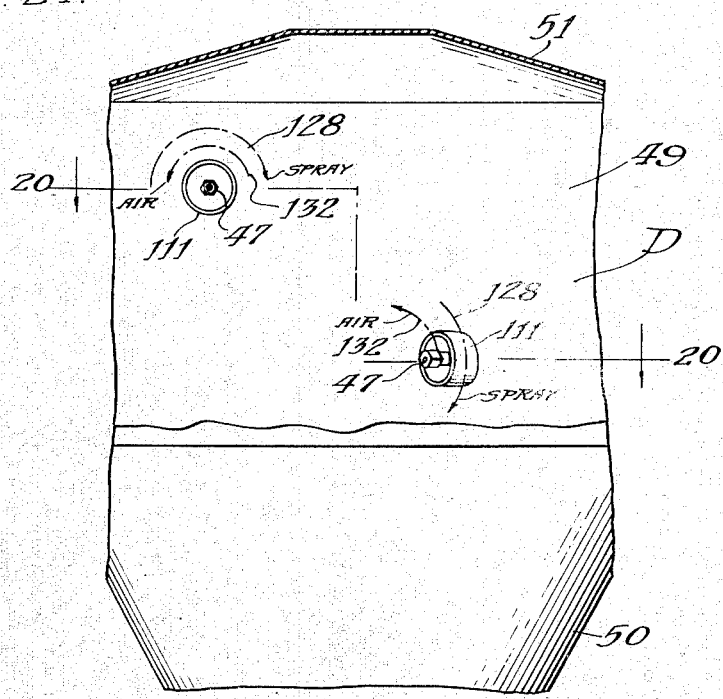

In said drawings, Figure 1 is a plan view of the main portion of the apparatus by which the invention is carried out. Fig. 2 is an elevation of the same, viewed from the right in Fig. 1, but omitting the pump, filter and cold wall tank of the earlier view. Fig. 3 is an elevation of primary and secondary collectors shown in conjunction with the cooling system, the view being indicated by the line 3—3 of Fig. 1. Fig. 4 is a plan view of the cooling system. Fig. 5 is a sectional elevation of the same, the supporting structure being omitted, the section being indicated by the line 5—5 of Fig. 4. Fig. 6 is a section through one of the heaters, the plane of section being indicated by the line 6—6 of Fig. 1. Fig. 7 is a sectional view on a somewhat enlarged scale of one of the snail shells or spirals through which the air flows on its way into the main precipitation chamber, the plane of section being indicated by the line 7—7 of Fig. 1. Fig. 8 is a horizontal section through the same, the plane of section being indicated by the line 8—8 of Fig. 7. Fig. 9 is a detail elevation of the damper on an enlarged scale showing the means for holding the damper in adjusted position, the same being part of the snail shell structure. Fig. 10 is a transverse section through the tube adjacent to the damper showing the same means in edge elevation, the plane of section being indicated by the line 10—10 of Fig. 9. Fig. 11 is a diagrammatic view illustrating the way in which the air and hot gases pass through the heater. Fig. 12 is a central section through the spray device. Figs. 13, 14, 15 and 16 are respectively sectional views through the several elements of the spray device, disassembled, the section of Fig. 15 being indicated by the line 15—15 of Fig. 19. Fig. 17 is a perspective view of the primary disk or inlet element, showing the several feeding openings through which the egg meat passes. Fig. 18 is a similar view of the secondary disk or main spraying element by which the material fed through the device receives its swirling motion. Fig. 19 is an elevation of the secondary disk. Fig. 20 is a plan view of a portion of the precipitation chamber and the spray system illustrating how the air and spray rotate as they are brought into the chamber, parts being shown in section indicated by the line 20—20 of Fig. 21. Fig. 21 is a vertical elevation of the same portion, viewed as indicated by the line 21—21 of Fig. 20. Fig. 22 is a central longitudinal section through the final drier. Fig. 23 is a transverse section through the tubular shaft, the plane of section being indicated by the line 23—23 of Fig. 22, but showing only the connection of one set of breaker arms, each succeeding set being disposed vectorially with reference to the set adjacent to it as indicated. Fig. 24 is an elevation and central vertical section, one-half shown in section, and the other half in vertical elevation, through the bearing of the drier shaft. Throughout these views like characters refer to like parts.

For the purposes of disclosure I will set forth at length one embodiment of the invention which produces egg powder, a product resulting from the dehydration of fresh eggs, including both yolks and whites. It will serve as illustrative since, as before noted, other substances may be similarly reduced to a dry powdered form.

In carrying out the new method, the egg meat, when properly freed from shell fragments, dirt and other objectionable matter, is supplied to the cold wall tank A from which it passes through filter B, and, by means of a high pressure pump C, is forced into the precipitation chamber D at a plurality of points. At each of these points heated air is also admitted. The air is supplied from a series of heaters E communicating through conducting conduits, designated generally F, to the precipitation chamber D. As it passes into the latter it passes through a plurality of snail shell devices G. These devices are distributed about the chamber D in two levels of four each. By reason of the internal spiral arrangement of each, the air passes into the precipitation chamber D as a whirling mass. The egg meat enters the whirling mass of air through spray heads at the center of the snail shell devices G, respectively. It is forced into the chamber D at great pressure and is given a motion of rotation opposite to that of the air. Consequently, the egg meat entering into the midst of this whirling mass of air at each device G and into the relatively large chamber D with its high vacuum, results in the natural drying of the egg meat with a large drop in temperature. The concentrate is thus gathered within the chamber in the form of a powder. The precipitation chamber D is made large so that the material may have room to break up into many small particles in contact with the air. In this way the superficial area of the material is greatly increased and the contact with the dry air causes the great evaporation with resultant drop in temperature and air pressure. From this point on it will be noted that a stream of air through the equipment has a greatly increased moisture content. When the air enters the chamber D it is heated to 350 to 400 degrees Fahrenheit, or even higher. Then because of the instantaneous natural evaporation, a high degree of vacuum is maintained and the solids drop. When they drop they have lost a large proportion of their original moisture. Then they enter the conduit wherein the final drier H is located. Here the last traces of moisture are removed. In the present instance this drier takes the form of a modified sanitary hammer-mill. In that mill the particles are violently jostled with the result that such further moisture as they contain, or at least a large portion of it, is brought to the surface and removed by the stream of unsaturated air. This action of the hammer mill causes the particles to travel through a long distance while being jostled. They are carried around and around in the mill as they pass through it. Then the stream of intermingled moist air and powder is caused to flow through the primary powder collector K by the suction of a suction fan L. In the primary collector K the greater portion of the powder is collected. A small amount of powder passes on beyond the primary collector K in the air stream. This is sucked by the fan L and then forced by it through suitable piping to the secondary powder collectors M and N. Here the residuum of the powder is recovered. Then through suitably operated powder valves the contents of the three collectors, K, M and N, is collected in the inlet pipe of a cooling system. This system operates at a lower degree of vacuum than that maintained by the main stream. This inlet pipe leads from a cooling element O past the outlets of the three collectors and on to a primary cooling cyclone collector P. From this it passes to a secondary cooling cyclone collector Q. And from that point on to a tapped opening near the outlet of the primary collector K. From the cooling collectors P and Q the powder passes to a sifter R, which it enters after passing through regularly operated powder valves. After being sifted it passes through an additional powder valve out of the equipment, a finished product.

It will be observed that in this operation the particles of the material being treated are protected throughout their course by the vapor of dehydration. Such vapor incloses the particles and prevents their being overheated and cooked. This protection occurs throughout the entire period that they are in the stream of air. In other words, it continues from the instant of evaporation upon entering the chamber D until the fan L is passed. This passage from the receiving point to the delivery point requires but a few seconds of time. Thus the protection of the vapor of dehydration, together with the great rapidity of the operation, results in maintaining the natural flavor and other characteristics produced in the reconstituted substance.

Referring now to the different pieces of apparatus that are employed it will be noted that the first is a cold wall vat A. This vat may be of any preferred construction. A suitable vat is disclosed in the application of Timothy Mojonnier, Serial No. 426,162, filed January 9, 1942, for Vats, issued on June 1, 1943, as Patent No. 2,320,531. This vat is supplied with egg meat through a pipe 40. From the bottom of the tank A a pipe 41 leads to the egg filter B.

The egg filter B may be of any desired construction and is located between the pipe 41 and the pipe 42.

The pipe 42 leads to a high pressure pump C. This is driven by a motor 43 and is arranged to feed the egg meat through pipe 44 to spray nozzles in the precipitation chamber D.

There are in the present disclosure eight of these spray systems arranged in two levels of four each. The piping for these spray nozzles includes a peripheral pipe 45 which extends completely around the precipitation chamber. From this are branch pipes 46 which lead to the centers of the spray systems, alternate pipes 46 extending upward to the upper set and the intermediate pipes 46 extending downward to the lower set. Each of these pipes 46 extends well within the precipitation chamber D and there terminates in a spray head 47. The spray nozzles are illustrated in detail in Figs. 12 to 19 inclusive. Each branch pipe 46 contains a cut-off valve 48 by which the supply to the respective heads 47 is controlled.

The precipitation chamber D is composed of a cylindrical portion 49 joined onto the top of a conical portion 50 and closed with a covering portion 51. As clearly illustrated, it is supported by the square frame 52 fitted into the building structure. To complete the well for the chamber D, the frame 52 has diagonal pieces 54 fitted in at three corners. The fourth corner is the corner where the final drier H is located. Hence the brace 54 at that corner is omitted. This frame 52 with its three braces 54 completes the enclosing well and is located at the level of the floor 55. At its lower end the chamber D closely approaches the level of the floor 56. These are merely illustrative. Any preferred supporting structure may be provided.

Coming now to the heaters E by which air is heated for its passage through the apparatus under the pull of the fan L, we find that the air is first filtered by passing through air filters 57 located within the room 58. It is drawn into the room (by the distantly located fan L) through the inlet 59. After passing the filters 57 it enters the heaters E. The room 58 may be provided with suitable openings 60 for entrance. This room is part of the building and is formed by the walls 61, 62, 63 and 64, the wall 64 being elongated to separate the chamber D from the heaters E. In the present instance there are ten such heaters. As clearly shown in Fig. 6 each heater comprises a gas chamber 65 where oil and air under pressure are commingled and combustion is produced. The products of combustion then pass upward among the heater elements 66 and out through the stack breaching 67. In Figs. 6 and 11 the arrows 68 indicate the direction of flow of the gas while the arrows 69 show the direction of air flow.

The filtered air upon passing from the chamber 58 enters the cold air duct 70. From this point it passes horizontally through the interior of the elements 66, first in one direction and then in the opposite, as indicated by the arrows 69, and finally out through the hot air duct 71 where it passes on to the vacuum snail shells G. For the purpose of regulating the amount of air so that each heater will do its part of the total work, there is provided at some point in each air passage, as for example in the outlet 71, a damper 74. Thus, there is a damper 74 associated with each of the heaters E so as to regulate the amount of air passed by that particular heater. In this way each heater is made to do its share of the work.

The gases, after passing into the stack connection 67, pass out through the stack 76. A direct connection provides for this. A damper 79 in the stack 76 controls the flow of the gas through the stack. A fan 80 driven by an electric motor 81 produces a forced draft in the stack. The heater per se forms no part of the present invention and so need not be further described.

The flue by which the heated air is conducted to the snail shell devices G, designated generally F, includes the heater outlet 71, the main upright flue 82, the peripheral flue 83 and the branch flues 84 and 85, the flues 84 being provided for connection with the lower snail shells G and the flues 85 in connection with the upper set.

The snail shell G is practically the same in each instance. In one case there is a diverted outlet into the precipitation chamber D but in other respects the snail shell is the same. This will be referred to later.

The snail shells G are arranged about the wall of the precipitation chamber D and each comprises a straight path and a plurality of spiral paths. Thus, each is a spiral device for spirally projecting air into the chamber D. In the present instance it will suffice to describe a snail shell G associated with the upright flue 85 instead of the flue 84. Thus, the air enters the straight tubular portion which is part, or continuation, of the vertical flue 85 and is at once divided into four spiral paths. These paths all lie between the outer curved wall 89 and the inner curved wall 90, and between the common flat plates 91 and 92 which serve what might be called the side walls of all of the paths both straight and curved. The respective curved paths are formed by the intermediate curved partitions 93, 94 and 95. They terminate upon the surface of an imaginary cylinder having its axis coincident with the axis of the spray head 47. Thus, the path between the curved walls 89 and 93 terminates at the point 96, the path between the curved walls 93 and 94 at the point 97, the paths between the walls 94 and 95 at the point 98, and the path between the walls 95 and 90 at the point 99. Thus, it will be seen that the rush of air which enters the snail shell through the straight tubular extension will emerge as a spirally directed mass into the outlet tube 100 which is continued on into the chamber D. The effect will be to cause the air to pass out of the outlet 100 in a swirling motion in the midst of which the spray of the egg meat occurs.

In the entrance to the snail shell G is a damper 103 operated by a handle 104. This damper may be variously set as required in operation. By means of the several dampers, one upon each snail shell, the amount of air delivered by each may be regulated. In the walls 89 and 90 the valve 103 finds its pivoted support. It is shown as a simple butterfly valve. Any suitable means may be employed for holding the damper in a set position. Thus, a fixed disk 106 having a number of holes 107 in it may be used in conjunction with an arm 108 fixed to the damper shaft. When the damper is set a hole 109 in the arm is made to register with one of the holes 107. The holes 107 are sufficiently close together to provide for any reasonable adjustment. A pin 110 may be thrust into the hole 109 and the selected hole 107 to hold the damper in adjusted position, anywhere between its fully closed and its fully open positions. This means is merely illustrative.

At the outlet end of the snail shell the tubular end 100 is provided with a tubular extension 111. The extension is firmly secured, preferably by welding, within an opening in the wall 49 of the chamber D. As clearly illustrated in Fig. 1, this tubular extension 111 passes through the wall 49 at an angle. The extension is first positioned in the wall 49 and welded therein and finally the snail shell is lifted up in place and the end 110 and extension 111 are secured together, preferably also by welding.

When it comes to diverting the outlet to one side, as is the case with one of the snail shells G, namely that having the outlet 114, it will be noted that the same is welded into the wall 49 of the chamber D just as was the extension 111. When the diverting tube 115 is welded to the end 100 of the snail shell G and finally the shell is properly positioned with the diverting tube attached and then the joint between the previously positioned tube 114 and the diverting tube 115 is completed.

It will be noted that the spray pipes 46 follow along the axis of the snail shell device to a point just a little in advance of the end of the outlet 111 in the case of the undiverted structures and to a point just in advance of the outlet 114 in the case of the diverted structure. There it terminates in the spray head 47.

It will be noted that the diversion introduced by the tubular pipe 115 is occasioned by the presence of the inclined final drier H at that point.

We may next consider the spiral spray device. It may be variously constructed. The disclosure in this respect is merely illustrative. The spray head 47 is located at the delivery end of the spray pipe 46 and comprises a casing member 116 which is screwed upon the end of the pipe 46. At its outer end it is exteriorly threaded for the reception of a cap 117. When the parts are assembled there lies between the cap 117 and the shoulder 118 of the member 116 an inlet element 119 and a main spraying member 120. The former is provided with four openings 121 each of which extends completely through the disk. These are positioned about the disk as illustrated. When the parts are in assembled position the passages 121 communicate with an annular space 122 cut into the adjacent face of the main spraying member 120. Thus the face of the member 119 engages the faces 123 and 124 of the member 120. It is noted that the disk 119 fits loosely within the devices but when pressed by the egg meat is forced against the faces 123 and 124. Through the center of the member 120, extending axially of the piece, is a central opening 125 which tapers from a wide opening at the intake end to a narrowed opening at the outlet end. Two passages 126 and 127 extend outward from the inlet end of the opening 125 through the separating wall to the space 122. These passages are tangential to the circular wall of the inlet opening 125. Consequently the portion of the egg meat which is driven therethrough will be given a swirling motion as it passes from the opening 125.

The spray nozzles, per se, form no part of the present invention except as they may occur in combination, and hence they need not be more fully described. The one shown is merely illustrative.

Having considered the snail shell and spray devices, we may now consider their action when in operation. Thus, as indicated in Figs. 12 and 20 the spray device ordinarily sends out its spray in a direction covering an angle of 100 degrees. It also sends it out in a swirl. The direction of the swirl is opposed to that of the air. This is indicated in Fig. 21 by the arrows 128. The direction in which the axis of these two devices projects is tangential to an imaginary circle 129, clearly indicated by the dotted tangents 130 and the imaginary circle 128 in Figs. 1 and 20. It will be noted that one imaginary circle 129 with its tangent 130 lies in the plane of the upper set of devices and the other in the plane of the lower set. These imaginary circles have their centers in the axis of the chamber. The spray issuing from the spray head 47 is indicated in Fig. 20 at the left hand and the air issuing from the discharge outlet 111 is shown at the right hand in said figure. The direction of the air flow is indicated in Fig. 21 by the arrow 132. The spread of the air stream is also considerable, as will appear from an inspection of Fig. 20. From what is shown and from a consideration of the opposite swirls of the air and egg meat it will be clear that there is an increased degree of intermixture. The fact that both are projected with great pressure will thus materially increase the mixing of the air and egg meat. Furthermore, discharging both in a direction tangential to the imaginary circles will tend to propel the mass about the center of the chamber D as it passes downward to enter the final dryer H. When the heated air and the egg meat are thus mixed, there will be a heavy drop in temperature and the deposit of a large percentage of powdered egg in the bottom of the chamber D.

The powder thus precipitated is next passed through the final dryer H. This is located at the point of the cone forming the bottom of the precipitation chamber D. All the powder and the air, now laden with moisture and at a much lower temperature, passes from the chamber D into the lower end of the drier H.

The apparatus H which comprises an improved form of hammer-mill, includes a cylindrical casing 133 having a lower end 134 closed except for the inlet 135 from the bottom of the chamber D. The egg meat powder is brought into the lower end of the casing 133 and is there beaten up or jostled to bring about the abstraction of more moisture. Within the casing 133 is a shaft 136 provided with suitable bearings 137 and 138 at its opposite ends, the former being located outside the casing. A pulley 139 is keyed to the shaft 136 at a point below the casing 133 and the bearing 137. By means of a suitable belt 140 the shaft 136 is driven by an electric motor 141. The speed of the shaft 136, in the particular installation chosen as a disclosure of the invention, is very high, approximating 1000 R. P. M. and the electric motor operates at 1800 R. P. M. The motor 141 is mounted to be with its axis parallel to the shaft 136. This shaft is provided with an intermediate bearing 142 mounted at the center of a web 143 secured at its ends to the casing 133. Similarly, the bearing 138 is mounted at the center of a web 144 which is secured at its ends to the casing 133, preferably by welding.

The lower end of the shaft 136 carries a propeller 145 having two propeller blades. Mounted upon the shaft 136 are a number of rods or vanes 146 which are arranged in a spiral fashion. Each set of rods 146 is offset with reference to the set directly beneath it, a slight amount. In the installation shown, this offset amounts to six degrees. As shown in Fig. 23 each set of vanes 146 comprises four vanes. Cooperating with these spirally mounted vanes 146 are fixed vanes 147. The fixed vanes extend inward from the wall of the casing 133. There is one row of the fixed vanes, although if found necessary there may be two or more, as desired. These vanes or blades 146 and 147 extend throughout the greater portion of the casing 133 of the hammer-mill. There is left however, a considerable space in the vicinity of the propeller 145. This suitably reduces the strain on the vanes which would otherwise occur if there were no propeller and space. It permits of a light construction. The rotating rods 146 and cooperating fixed rods 147 beat up and thoroughly agitate the powder.

By striking the particles, they bring the moisture they contain to the surface of the powder particles from which it is readily abstracted by the unsaturated air that passes through the casing 133. The air and the powder enter the casing 133 by way of the opening 135, from the precipitation chamber D. All of the powder and air pass through the casing 133.

For supporting the shell 133, a plurality of legs 148 are provided. At their upper ends these legs are secured to a ring 149 which surrounds the cylindrical structure and is properly secured to it. The lower ends of the legs 148 are likewise provided with shoes 150 which rest upon the floor 56.

Obviously, the bearings 137 and 138 may be variously constructed. The bearing 138, however, is a thrust bearing and may require a little consideration. At one end of the shaft is a thrust collar 151. A similar collar 152 is located some distance from the end of the shaft. These collars are secured to the shaft by flat head bolts, 153, 154. Between the thrust collars 151 and 152 is an outwardly convexed segmental bearing 155. Within the space formed within the bearing member 138 and outwardly of the convexed segmental bearing 155 is a pair of cooperating bearings 156. The bearings 155 and 156 serve as runways for the bearing rollers 157. There are two sets of rollers 157 carried within suitable baskets 158. The whole is enclosed by a threaded sleeve 159 which is screwed into the interior of the main bearing 138 by a suitable spanner wrench acting within the openings 160. The grooves 161 are provided for the purpose of giving a grease seal. Thus the end of the shaft 136 is mounted for rotation within the bearing 138.

The upper end of the hammer-mill H is connected through suitable tubing to the intake 164 of the primary collector K. This tubing includes the relatively straight tubes 165, 166, 167 with the intervening elbows 168, 169. The intake 164 is shaped to maintain its cross section the same as that of the pipe 167. It is made narrow and deep as illustrated. The intake 164 is approximately tangential to the collector K as is usual in cyclone construction. It includes an upper cylindrical portion 170 and a lower conical portion 171. At its lower end it is provided with a powder valve 172 which leads to the cooling system. The fan L applies a suction through an elbow 173 which carries off some of the powder to the secondary collectors M and N.

The primary collector K is mounted upon the same level as the frame 52 in which the precipitation chamber D is mounted, and projects a short distance below that level. The fan L is mounted at the elevation shown upon a suitable bracket 174 carried near the upper end of the collector K. An electric motor 175 drives the fan L through a suitable belt connection 176.

After passing the primary collector K very little powder will remain. Any that does is at once passed into the inlets of the secondary collectors M and N. One of these connections is made through pipe 177 and other through pipe 178. These are the ordinary cyclones and separate the material from the air by ordinary cyclonic action. The heavier particles settle and the lighter ones are carried through the stacks 179 and 180. From the delivery points of these cyclones M and N, the residue of the powder collected is carried through the tubes 181 and 182 to the powder valves 183 and 184. These valves deposit the residue within the inlet pipe of the cooling system.

Taking up the frame structure, it will be noted that there are uprights and beams. The uprights 187, 188, 189 and 190 extend the full extent, namely, through three floors. The beams of the second floor are the beams 191, 192, 193 and 194. Those of the third floor are the beams 195, 196, 197 and 198. For the upper roof structure there are the beams 199, 200, 201 and 202. These posts and beams are arranged in common factory construction. Ordinarily reinforced concrete would be employed. However, any other preferred construction might be used for the housing and for the supporting elements.

The floor structure 203 covers the beams on the second floor. A similar structure 204 is employed for the third floor. The roof comprises the surface structure 205. The floors are cut away where it is necessary to place the different elements of the system.

Besides these parts, there are the beams 206, 207 and 208 arranged in the manner shown in Figs. 1 and 4. These occupy the second floor of the structure which is in line with the previously described floor structure 55. The collector K is supported above the second floor by a plurality of legs 211, and extends through an opening in the second floor. Obviously, this construction may be varied according to the judgment of the designer.

The rotary powder valve 172 has its upper end 212 connected to the outlet end of the collector K and its lower end 216 connected to the tubular intake 222 of the cooling system which is supplied with a different vacuum from that of the collector. The valve 172 is power driven preferably by an electric motor (not shown). The valves 183 and 184 are of the same construction.

Since the valves 183 and 184 are the valves of the secondary collectors M and N, they are used in depositing the contents of those collectors within the same intake 222 of the cooling system. The valve 183 connects the outlet tube 181 with the intake 222 at the point 229. Similarly the valve 184 connects the tubular outlet 182 of the secondary collector N to the intake tube 222 at the point 230.

It is at once obvious that the apparatus might end here. That is to say, the product powder might be deposited by the valves 172, 183 and 184 into receptacles (not shown) and the cooling system might be avoided. But, inasmuch as the powder is hot, namely about 100 degrees Fahrenheit, it may be well to cool it. Whether or not it is to be cooled depends largely upon the original substance which is being treated.

Going on then with the cooling system, it will be noted that the intake 222 is made up of a horizontal tube 231, a vertical tube 232 and a second horizontal tube 233. These are connected together as shown and terminate in the intake tube 234 of the primary cooling cyclone P. The outlet from this cyclone is designated 235 and leads upward to a horizontal tube 236, which is connected tangentially to the secondary cooling cyclone Q. The outlet of this secondary cyclone is a tube 237 which extends vertically and is connected to a horizontal tube 238 which connects through an elbow 239 with the tube 173 on the primary collector K.

Thus it will be seen that the fan L by pulling air through the collector K of the main system will exert a certain pull upon the air admitted to the intake of the cooling system. Specifically, this pull will be exerted through the secondary cooling cyclone Q, the primary cooling cyclone P and thence to the intake 222. Thus the powder deposited by the valves 172, 183 and 184 will be drawn through the intake 222 of the cooling system and separated by the cyclones P and Q.

This will not be done, however, until the air entering the intake 222 has been cooled by the cooling element O. This element consists of cooling coils (not specifically shown), which are used to receive a charge of ammonia, and thus provide a cooling surface. In the device shown, it will be necessary to cool down the powder from about 100 degrees Fahrenheit to about 65 degrees. The cooling unit O must be of sufficient capacity to cool about 2,000 cubic feet of air per minute entering the intake 222. Obviously, as the cold air is sucked through the intake 222 and the primary and secondary cyclones, all the contents of the system will be passed through this cooling tube and collected primarily in the cooling cyclone P and such as goes beyond that cyclone will be collected in the secondary cooling cyclone Q. That which is collected by the cyclone P passes downward through a collecting tube 242. Similarly that which is collected by the cyclone Q passes down through tube 243. Rotary powder valves 244 and 245 control these outlets 242 and 243 respectively. These valves are the same in construction as the valve 172 previously described. From these valves the powder passes down into the sifter R.

The sifter R comprises a boxlike structure having a frusto-pyramidal bottom 249 with a delivery opening at its low point. It is connected at its upper side to receive powder from the valves 244 and 245, connection being established through the collars 255 engaging the downward projections 216 upon the valves. A cold air inlet duct 270 is provided at the end of the sifter R. The rotary elements of the sifter are preferably power driven, an electric motor (not shown) being preferably provided for the purpose.

From this it will be seen that the cooled product is received within the sifter and deposited into a suitable container.

Except for the material employed in the building structure, all the other materials are practically steel or iron or otherwise as will be obvious.

In a plant having the capacity of about 1000 pounds of egg powder per hour, it will be necessary to have a precipitation chamber about 38 feet in diameter with a height of about 54 feet, with the other parts in the proportion shown. In such a system the fan L will have a capacity of about 16,000 cubic feet per minute at about 130 degrees Fahrenheit. The air will be heated from 350 to 400 degrees Fahrenheit at the heaters. Upon reaching the precipitation chamber there will be a drop to about 145 degrees Fahrenheit, which will be reduced slightly and delivered to the secondary collectors at approximately 130 to 135 degrees Fahrenheit. The egg meat is introduced through the various vacuum spray devices at about 3000 pounds pressure per square inch. It is supplied through the cold wall vat at about 40 degrees Fahrenheit or lower. Egg meat tests 27% total solids when in its liquid state. This means that 3700 pounds of egg meat per hour are required to produce 1000 pounds of powder per hour. In other words, about 2700 pounds of moisture per hour would be evaporated.

The temperature of the air must be kept up so that the air never becomes fully saturated.

The vacuum produced by the fan will ordinarily be measured in inches of water. When so measured it will run approximately ⅞ inches at the intakes to the heaters, 1¾ inches at the heater outlets, 2¼ inches at each of the vacuum spray devices, 3½ inches at the entrance to the hammer-mill, 4 inches at the entrance to the primary collector and 12 inches at the fan. This is all suction. From the fan on it will be pressure. The amounts will be approximately 3¼ inches at the fan outlet and ⅜ inch at the secondary collector outlets 150 and 151.

In this process the greater portion of the moisture is taken up when the substance mingles with the air in the precipitation chamber. Before it is dehydrated, it may contain from 27% to 40% total solids. When introduced at 3,000 pounds pressure per square inch into the chamber with air at 350 or 400 degrees Fahrenheit, it is reduced to practically 92% total solids when it is collected at the bottom of the precipitation chamber, and subsequently in the final drier is brought to a powder having upwards of 95% total solids.

In the cooling system the pressure at the entrance to the intake is approximately from 2 inches to 5 inches. At the inlet to the primary cooler cyclone it is 6 inches. At the inlet to the secondary cyclone 9 inches, and at the point where it enters the main stream of air, 12 inches.

While the above data is given more or less detail it is to be understood that the same is given by way of example only and that the invention may vary within wide limits.

Thus, the initial substance may vary greatly in moisture content and will be considered a powder when the same has a moisture content of less than ten per cent. The spray may also be varied. Much will depend upon the substance employed. A pressure at the intakes may be used which is as low as 1500 pounds per square inch. The temperature within the chamber may also be greatly varied. It will ordinarily suffice if as low as 250 degrees Fahrenheit. The action within the chamber may reduce the substance only to 85 per cent. total solids and the temperature of the air there be only 120 degrees Fahrenheit.

These values will give some idea of the scope of the invention, which should not be limited beyond the terms of the appended claims.

It is believed that the invention will be sufficiently understood with the examples given. Such changes as may be made in the practice of the invention will readily suggest themselves to persons skilled in the art without further disclosure.

I claim:

1. The method of dehydrating a liquid substance of the class described in a gaseous drying medium; which method consists in continuously sucking a stream of the heated medium through a closed path including a precipitation chamber, a conduit and a cyclone in series; giving the medium a swirling motion in said chamber; injecting the liquid substance under pressure into the swirling medium within said chamber, thereby precipitating the substance as a powder within said chamber, the medium giving off heat and taking up moisture; then violently jostling the precipitate wholly within the suction stream of heated medium, within the conduit after it leaves the precipitation chamber and before it enters the cyclone, to extract more moisture from it and add the same to the moisture content of the stream of heated medium but still without increasing its moisture up to the saturation point; and finally separating the resulting product from the medium in part by cyclonic suction action.

2. The method of dehydrating a liquid substance of the class described in a gaseous drying medium; which method consists in continuously sucking a stream of the heated medium through a closed path including a precipitation chamber, a hammer mill and a cyclone in series; giving the medium a swirling motion in said chamber; injecting the liquid substance under pressure into the swirling medium within said chamber, thereby precipitating the substance as a powder within said chamber, the medium giving off heat and taking up moisture; then violently jostling the precipitate by hammer-mill action to extract more moisture from the precipitate and add it to the fast flowing stream of heated medium without increasing its moisture up to the saturation point; and finally separating the resulting product from the medium by cyclonic action.

3. The method of dehydrating a liquid substance containing upwards of twelve per cent. total solids to a practically dry powder containing upwards of ninety per cent. total solids; which method consists in continuously forcing a spray of said liquid substance at a pressure upwards of fifteen hundred pounds per square inch into a whirling mass of heated air supplied by suction to a relatively large capacity closed chamber at a temperature upwards of two hundred and fifty degrees Fahrenheit, thereby by natural evaporation within the chamber large quantities of water are given off by the substance and taken up by the air, the substance being reduced to upwards of eighty-five per cent. total solids and the temperature of the air being reduced to upwards of one hundred and twenty degrees Fahrenheit; then subjecting the resultant substance to violent jostling within the suction stream at upwards of one hundred and twenty degrees Fahrenheit, thereby reducing the substance to a fine powder of upwards of ninety per cent. total solids and the air suction taking up more of the moisture; then separating the resulting powder from the moist air while still under suction, the moist air of said stream never reaching the saturation point; and finally separating the residual powder from the moist air by cyclonic action.

4. The method of dehydrating egg meat to a practically dry powder containing upwards of ninety-five per cent. total solids; which method consists in continuously forcing the egg meat at a pressure of substantially three thousand pounds per square inch into a whirling spray of heated air within a relatively large capacity closed chamber supplied by suction at a temperature of substantially three hundred and fifty degrees Fahrenheit, thereby by natural evaporation within the chamber large quantities of water are given off by the egg meat and taken up by the air, the egg meat being reduced to practically ninety-two per cent. total solids and the temperature of the air being reduced to approximately one hundred and forty-five degrees Fahrenheit; then subjecting the resulting powdered egg meat to violent jostling within the air stream at approximately the same temperature, thereby reducing the egg meat to a fine powder of at least ninety-five per cent. total solids, and the air stream taking up additional moisture; then separating the powdered egg product from the air, the moist air of said stream never reaching its saturation point; and finally separating the remaining egg powder from the moist air by cyclonic action.

5. The method of drying a liquid substance of the class described; which method consists in providing a closed path for the substance including a precipitation chamber, a hammer mill and cyclone in series; drawing a stream of hot air at sub-atmospheric pressure through said path, said air entering the path at a temperature of upwards of two hundred and fifty degrees Fahrenheit; projecting a spray of the substance into said precipitation chamber at a pressure of upwards of fifteen hundred pounds per square inch thereby by natural evaporation within said chamber greatly lowering the temperature of the air and precipitating the substance as a powder, subsequently beating said powder in said hammer mill in the stream of heated air and vapor at its reduced temperature as it draws the powder onward through said path, and then separating the powder and unsaturated stream of vaporized air by cyclonic action.

6. The method of drying a liquid substance of the class described; which method consists in providing a closed path for the substance including a precipitation chamber, a hammer mill and a cyclone in series; drawing a stream of heated air at sub-atmospheric pressure through said path, said air varying in degree of vacuum from point to point, in temperature from a maximum at the intake to a minimum at the outlet and in moisture content as it takes up moisture from the initially liquid substance; projecting a spray of the liquid substance into the precipitation chamber at a high pressure thereby by natural evaporation within the chamber greatly lowering the temperature of the air and precipitating the substance as a powder; subsequently treating said powder to jostling within the stream of heated air to remove some of the moisture therefrom; and subsequently collecting the subsequently treated powder.

7. An apparatus for drying a liquid substance of the class described; comprising a closed precipitation chamber; a plurality of spray devices arranged about the chamber in position to supply the liquid material to the interior of the chamber; spiral devices associated with the spray devices providing access to the chamber to thoroughly mix the incoming medium and substance; means communicating with the chamber for violently jostling the mixture; a tubular conduit leading from said jostling means; a cyclonic collector operatively connected to the tubular conduit; a suction fan communicating with the outlet of said collector; a heater for the medium entering the chamber; means associated with the heater for regulating the flow of the medium whereby a stream of the hot medium is maintained at sub-atmospheric pressure through said chamber, jostling means, conduit and cyclonic collector by said fan; and means for receiving said product from said collector, the air and vapor continuing on through said fan.

8. An apparatus for drying a liquid substance of the class described; comprising a closed precipitation chamber; a plurality of spray devices arranged about the chamber in position to supply the liquid material to the interior of the chamber; spiral devices associated with the spray devices providing access to the chamber to thoroughly mix the incoming medium and substance; a hammer-mill having its interior communicating with the interior of said chamber near its lower end; a tubular conduit leading from the hammer-mill outlet; a cyclonic collector operatively connected to the tubular conduit; a suction fan communicating with the outlet of said collector; a heater for the medium entering the chamber; means associated with the heater for regulating the flow of the medium whereby a stream of the hot medium is maintained at sub-atmospheric pressure through said chamber, hammer-mill, conduit and cyclonic collector by said fan; and means for receiving the product from said collector, the air and vapor passing on through said fan.

9. An apparatus for drying a liquid substance of the class described; comprising a heater; a closed precipitation chamber; a plurality of spiral devices in said chamber about the walls thereof; jostling means communicating with said chamber; a tubular conduit leading from said jostling means; a cyclonic collector operatively connected to said tubular conduit; a suction fan communicating with the outlet of said collector and operative to draw a stream of heated air from said heater through said precipitation chamber, said jostling means, said tubular conduit and said collector, all of said elements being closed off from atmosphere whereby a subatmospheric pressure is maintained therein; a plurality of spray devices associated with said spiral devices providing access to said chamber; and means for supplying said liquid material to said spray devices and thence to the interior of said chamber whereby in operation the substance is precipitated in powdered form in the bottom of said chamber and is subsequently jostled all in the same stream of heated air and separated within said collector.

10. An apparatus for drying a liquid substance of the class described; comprising a closed precipitation chamber; a plurality of snail shells communicating with said chamber at different points arranged about the chamber, each said shell pointing in a direction tangential to an imaginary circle having the axis of the chamber as its center and each said shell opening into the chamber in a curved path to give the incoming medium a swirl in one direction; a plurality of spiral spray devices one for each shell, each spray device being practically concentric with its associated shell and terminating beyond the outlet of said shell within the chamber where its spray will be discharged spirally in a direction opposed to that of said medium; means communicating with the chamber at a point below said spiral devices for violently jostling the mixture; a tubular conduit leading from said jostling means; a cyclonic collector operatively connected to the tubular conduit; a suction fan communicating with the outlet of said collector; a heater for the medium entering the chamber; means associated with the heater for regulating the flow of the medium whereby a stream of the hot medium is maintained at sub-atmospheric pressure through said chamber, jostling means, conduit and cyclonic collector by said fan; and means for receiving said product from said collector, the air vapor continuing on through said fan.

11. In apparatus for drying a liquid substance of the class described comprising a precipitation chamber; means for supplying liquid substance to the interior of the chamber; means through which a gaseous medium may be drawn into the chamber and mixed with the liquid substance; means communicating with the chamber for violently jostling the mixture; a tubular conduit leading from said jostling means; a primary cyclonic collector operatively connected to said tubular conduit; a fan communicating with the outlet of said collector by a suction action; a secondary cyclonic collecting means communicating with the outlet of said fan and receiving pressure therefrom, whereby the primary collector operates by suction and the secondary collecting means operates by pressure; a heater for the medium entering the chamber; and means associated with the heater for regulating the flow of the medium, whereby a stream of the hot medium is maintained at sub-atmospheric pressure through said chamber, jostling means, conduit and primary collector up to the suction side of said fan and from there on out through the secondary collecting means as a pressure stream.

JULIUS J. MOJONNIER.